US009418558B1

(12) United States Patent
Stamenkovich et al.

(10) Patent No.: US 9,418,558 B1
(45) Date of Patent: Aug. 16, 2016

(54) AUTONOMOUS COLLISION AVOIDANCE NAVIGATION SYSTEM AND METHOD

(71) Applicants: Miroslav Stamenkovich, Virginia Beach, VA (US); Robert Alexander Greer, Virginia Beach, VA (US)

(72) Inventors: Miroslav Stamenkovich, Virginia Beach, VA (US); Robert Alexander Greer, Virginia Beach, VA (US)

(73) Assignee: The United States of America as represented by Secretary of the Navy, Washington, DC (US)

( * ) Notice: Subject to any disclaimer, the term of this patent is extended or adjusted under 35 U.S.C. 154(b) by 121 days.

(21) Appl. No.: 14/224,983

(22) Filed: Mar. 25, 2014

(51) Int. Cl.
*G08G 3/02* (2006.01)
*G01C 21/00* (2006.01)

(52) U.S. Cl.
CPC . *G08G 3/02* (2013.01); *G01C 21/00* (2013.01)

(58) Field of Classification Search
CPC .................................. G08G 3/02; G01C 21/00
See application file for complete search history.

(56) References Cited

U.S. PATENT DOCUMENTS

| 8,612,085 | B2* | 12/2013 | Flohr | G05D 1/0011 701/27 |
| 8,665,122 | B2* | 3/2014 | Klepsvik | G01S 17/10 318/588 |
| 8,949,015 | B2* | 2/2015 | Choi | G08G 3/02 701/301 |
| 9,086,278 | B2* | 7/2015 | Carnevali | G01C 21/00 |
| 2003/0233176 | A1* | 12/2003 | Cerchione | B63B 49/00 701/21 |
| 2010/0133022 | A1* | 6/2010 | Chung | A47L 9/009 180/21 |
| 2011/0128162 | A1* | 6/2011 | Klepsvik | G01S 17/10 340/985 |
| 2012/0316769 | A1* | 12/2012 | Gagliardi | G08G 3/02 701/300 |
| 2014/0003193 | A1* | 1/2014 | Schmidt | G01S 15/93 367/88 |
| 2014/0067249 | A1* | 3/2014 | Gagliardi | G08G 3/02 701/301 |

FOREIGN PATENT DOCUMENTS

KR 20090069711 A * 7/2009
KR 100913353 B1 * 8/2009

* cited by examiner

*Primary Examiner* — Tuan C. To
(74) *Attorney, Agent, or Firm* — SPAWAR Systems Center Atlantic; Kyle Eppele; Susanna J. Torke

(57) ABSTRACT

An Autonomous Collision Avoidance Navigation System comprising navigating a route between a first location and a second location using a route tracking algorithm, detecting an obstacle and the obstacle's bearing, speed, distance, and direction of travel with respect to ownship, determining whether a collision between the ownship and the obstacle is probable, reducing ownship speed when a collision distance is less than a predetermined distance, determining a new heading using fuzzy logic and MCAD, and changing ownship course to the new heading, and to resume the route tracking algorithm when the obstacle is cleared from probably collision.

13 Claims, 7 Drawing Sheets

|    | STB1 | PRT1 | STB2 | STB3 |
|----|------|------|------|------|
| VL | PS   | NS   | PS   | PM   |
| LG | PS   | NM   | PS   | PM   |
| ME | PS   | NM   | PS   | PM   |
| SM | PM   | NM   | PS   | PB   |
| ZE | PM   | NB   | PM   | PB   |

AUTONOMOUS COLLISION AVOIDANCE NAVIGATION SYSTEM AND METHOD

FEDERALLY SPONSORED RESEARCH AND DEVELOPMENT

This invention is assigned to the United States Government and is available for licensing for commercial purposes. Licensing and technical inquiries may be directed to the Office of Research and Technical Applications, Space and Naval Warfare Systems Center, Code 70000-CTO, N. Charleston, S.C., 29419; voice (843) 218-4000; email T2@spawar.navy.mil. Reference Navy Case Number 101407.

BACKGROUND OF THE INVENTION

This disclosure relates generally to the field of navigation and more particularly to autonomous navigation systems.

Traditional navigation systems require human decision making based on the use of a combination of established navigation rules and sensor data (e.g., radar data) to avoid collisions with other vehicles or obstacles. Such systems are prone to human error. A need exists for an autonomous navigation system that does not require human decision making to avoid collisions.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

The autonomous collision avoidance navigation system includes a general purpose computer having non-transitory memory, throttle actuator, rudder actuator, obstacle detection device, gyrocompass and autopilot controller. In one embodiment, the general purpose computer includes a Fuzzy Modified Course Alteration Diagram (MCAD) controller, collision avoidance behavior, behavior selection module and mission tracking behavior. The autonomous collision avoidance navigation method includes the following steps: navigating a predetermined route of travel for a vehicle, detecting an obstacle within a given range or distance of the vehicle, determining whether a collision between own ship and the obstacle is possible, reducing vehicle speed if a collision distance is less than a predetermined distance, determining a new heading using fuzzy logic and MCAD and changing course to the new heading. Route planning and monitoring are two features that may be included in the claimed subject matter.

BRIEF DESCRIPTION OF THE DRAWINGS

FIG. 4 is one embodiment of a fuzzy rule set for system response chart of an Autonomous Collision Avoidance Navigation System.

DETAILED DESCRIPTION OF THE INVENTION

Figure 1:
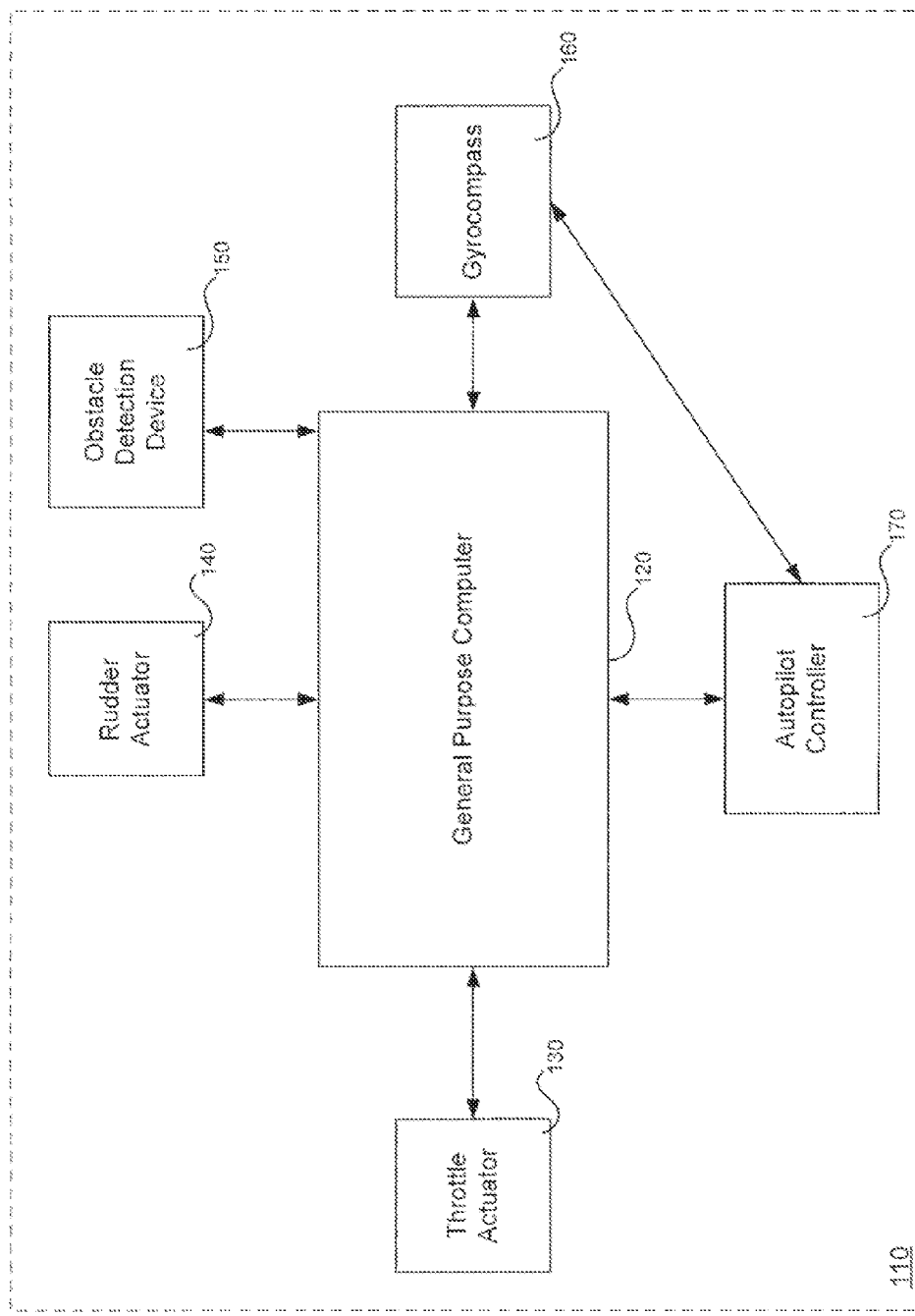
FIG. 1 is a block diagram of one embodiment of an Autonomous Collision Avoidance Navigation System (ACANS).

FIG. 1 is a block diagram of one aspect of the disclosed embodiment of an autonomous collision avoidance navigation system (ACANS). It is understood that the various elements, components and methods described herein are example embodiments of each item. As shown in FIG. 1, the ACANS 110 includes a general purpose computer 120, a throttle actuator 130, a rudder actuator 140, an obstacle detection device 150, a gyrocompass 160 and an autopilot controller 170. Each item is described in greater detail below.

The general purpose computer (GPC) 120 is designed to perform computations and execute instructions. The GPC 120 includes a central processing unit, input device, output device and memory. Examples of GPC 120 include laptop computers, tablet computers, personal digital assistants and handheld computers. Throttle actuator 130 is operatively coupled to GPC 120 and is designed to control the output of the propulsion unit of a watercraft. The throttle actuator 130 controls the propeller speed of a marine engine of a ship. Throttle actuator 130 receives commands from and outputs operational information to GPC 120. Rudder actuator 140 is operatively coupled to GPC 120 and is designed to position the rudder of a watercraft. The rudder actuator 140 receives commands from and outputs operational information to GPC 120. Obstacle detection device 150 is operatively coupled to GPC 120 and designed to detect an obstacle and measure bearing and distance to the obstacle. The obstacle detection device 150 may be comprised of a RADAR system such as automatic radar plotting aid RADAR system and a DOPPLER RADAR system. Alternate embodiments of the obstacle detection device 150 include a LIDAR or SONAR systems. Alternate configurations of the obstacle detection device 150 could also include capability for detecting the speed and/or direction of travel of obstacles. Gyrocompass 160 is operatively coupled to GPC 120 and designed to indicate the direction of true north. In one embodiment, gyrocompass 160 comprises a typical small craft or USV gyrocompass, such as a KVH GyroTrac. Alternatively, the Honeywell H764, GG1320 or a Kearfott KN5050 Inertial Navigation System (INS) may be suitable depending upon the size of the vessel. Autopilot controller 170 is operationally coupled to GPC 120 and Gyrocompass 160. Autopilot controller 170 is designed to control one's ownship course heading based on input from gyrocompass 160 and GPC 120. In one embodiment, autopilot controller 170 receives the direction of true north and the heading of the unmanned vehicle from gyrocompass 160 and desired course heading from GPC 120. The autopilot controller 170 outputs speed change and course change information to GPC 120, which outputs commands to throttle actuator 130 and rudder actuator 140. In one embodiment, autopilot controller 170 comprises a heading sensor, computer processing unit, and a driving unit for issuing course corrections to maintain heading. Additional or alternate sensors can be incorporated such as ones incorporating receivers that utilize satellite based signals for position determination, such Global Position Satellite constellation managed by the United States Air Force. There are many commercial marine autopilot systems currently offered such as the NAVpilot 700 by the Furuno Electric Company of Japan, the P70R by Raymarine Electric Company, a part of FLIR Systems of Wilsonville, Oreg., or the GHC 10 by Garmin International, Inc. of Olathe, Kans. that would be suitable for use in an ACANS embodying the disclosed invention.

Figure 2:
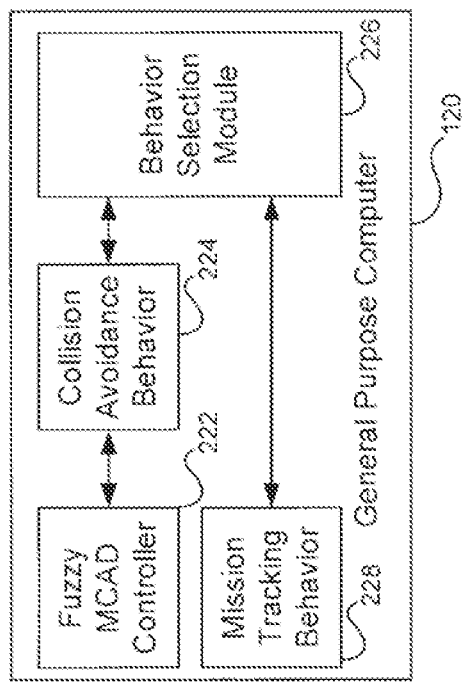
FIG. 2 is a block diagram of the General Purpose Computer of FIG. 1.

FIG. 2 is a block diagram of one embodiment the GPC 120 of FIG. 1. As depicted, GPC 120 includes fuzzy MCAD controller 222, collision avoidance behavior module 224, behavior selection module 226 and mission tracking behavior module 228. The fuzzy MCAD controller 222 is designed to provide turning guidance to one's ownship based on a detected obstacle's bearing and distance. The fuzzy MCAD controller 222 receives distance and bearing information from obstacle detection device 150 and subsequently provides output signals that contain turning guidance control information to collision avoidance behavior module 224. Operation of the fuzzy MCAD controller 222 is described in greater detail below with reference to FIGS. 3-6.

Collision avoidance behavior module 224 is designed to receive information from fuzzy MCAD controller 222 and provide appropriate course and speed changes to behavior selection module 226 in order to avoid a potential collision with a detected obstacle. Collision avoidance behavior module 224 required course changes are directly governed by the fuzzy MCAD controller 222 and speed changes are governed by obstacle Closest Point of Approach (CPA) distance. When a detected obstacle's distance is within a given range such as CPA/4, the speed of the ownship is reduced to a predetermined value, such as 6 knots, via a control signal from the GPC 120 to the throttle actuator (see FIG. 1).

Mission tracking behavior module 228 receives information from autopilot controller 170. In one embodiment, mission tracking behavior module 228 receives rudder control information from autopilot controller 170 via the rudder controller connection with the GPC. Mission tracking behavior module 228 outputs information to behavior selection module 226. Mission tracking behavior module 228 calculates cross-track error between waypoints and outputs a recommended course to steer to minimize cross-track error while also considering intended heading of autopilot controller 222.

Behavior selection module 226 is designed to output a rudder response to boat rudder actuator 140 (FIG. 1) based on input received from collision avoidance behavior module 224 and mission tracking behavior module 228. Behavior selection module 226 selects and passes either mission tracking behavior 228 or collision avoidance behavior 224 to boat rudder actuator 140. Behavior selection module 226 always chooses collision avoidance behavior if an obstacle has been detected and given the current course and speed of ownship a collision is deemed likely.

The operation of one embodiment of a fuzzy MCAD controller 222 is now described in greater detail with reference to FIGS. 3-6. The fuzzy MCAD controller 222 provides ownship turning and velocity guidance based on the determined bearing and distance to an obstacle. If the distance to an obstacle is greater than a predetermined distance (e.g., 600 meters), then fuzzy MCAD controller 222 determines ownship turning guidance based on the rules captured in the MCAD of FIG. 3. Fuzzy MCAD controller 222 may additionally determines ownship turning and velocity guidance based on fuzzy logic graphs and a predetermined rule set such as the rule set of FIG. 4 and the fuzzy logic graphs of FIGS. 5-6.

Figure 3:
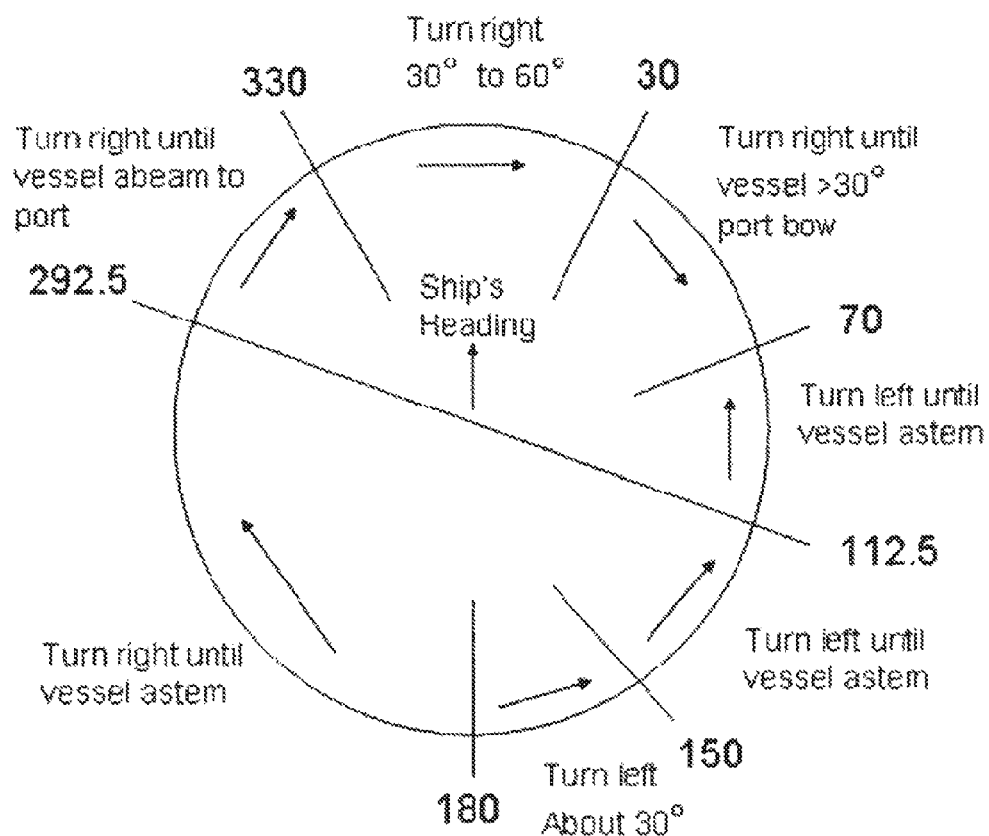
FIG. 3 is one embodiment of a modified course alteration diagram of an Autonomous Collision Avoidance Navigation System.

FIG. 3 is one embodiment of a modified course alteration diagram for use by the fuzzy MCAD controller 222 (FIG. 2). As shown in FIG. 3, MCAD provides ownship turning guidance based on an obstacle's bearing for distances greater than a generally arbitrary, predetermined distance. As mentioned above, the predetermined distance for the described example is 600 meters and is sometimes referred to as the Closest Point of Approach (CPA). Each of the bearings in FIG. 3 is relative to an ownship heading of zero degrees. As depicted in FIG. 3, for an obstacle between 331 and 30 degrees (inclusive), the predetermined MCAD guidance is for ownship to turn right (i.e., starboard) 30 to 60 degrees. For an obstacle between 31 and 70 degrees (inclusive), the MCAD guidance is for ownship to turn right until the obstacle is greater than 30 degrees to ownship port bow. For an obstacle between 71 and 150 degrees (inclusive), MCAD guidance is for ownship to turn left (i.e., portside) until the obstacle is astern. For an obstacle between 151 and 180 degrees (inclusive), MCAD guidance is for own ship to turn left approximately 30 degrees. For an obstacle between 181 and 292.5 degrees (inclusive), MCAD guidance is for own ship to turn right until the obstacle is astern. For an obstacle between 292.6 and 330 degrees (inclusive), MCAD guidance is for own ship to turn right until the obstacle is abeam to port. Those skilled in the navigation arts shall recognize that other MCAD guidance may be used with fuzzy MCAD controller 222 without departing from the scope or spirit of ACANS 110.

Figure 5:
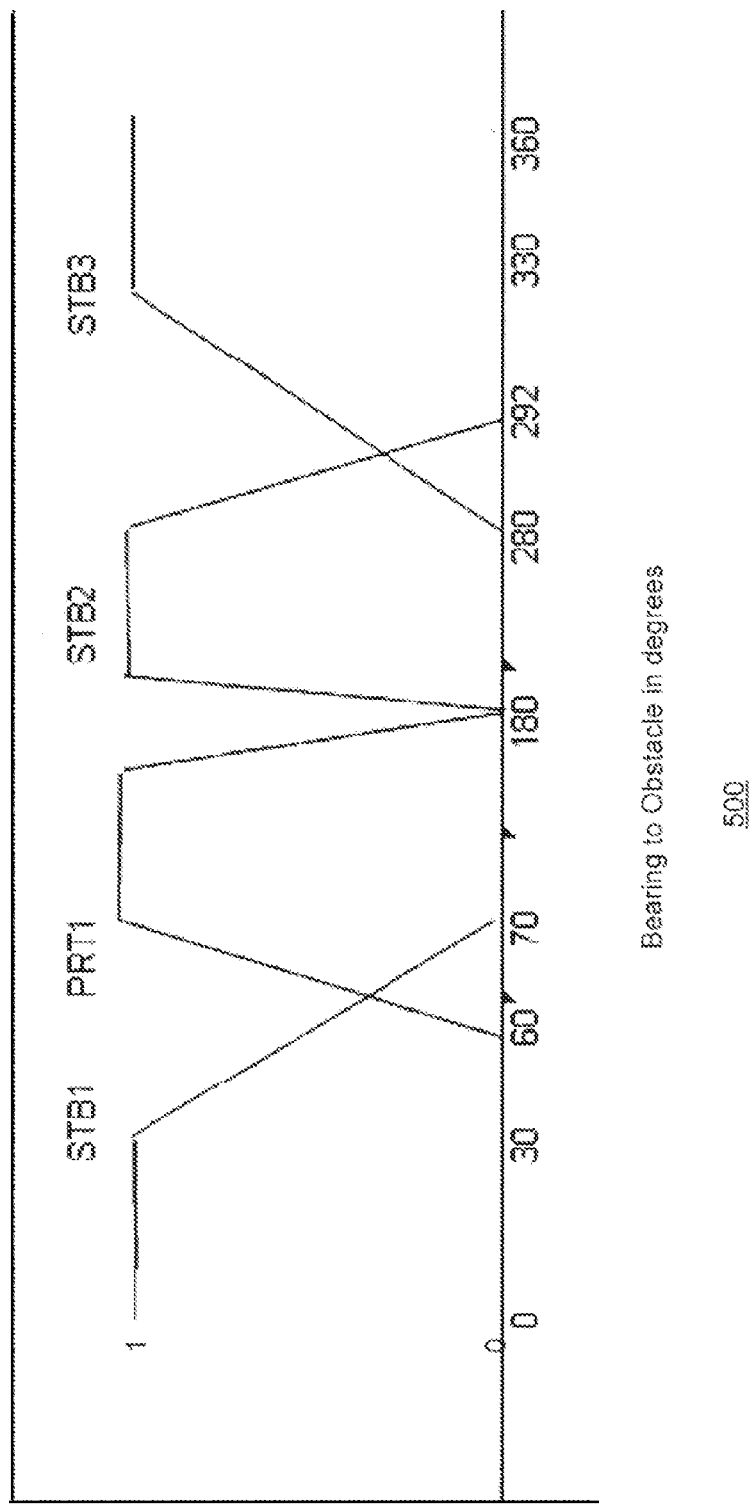
FIG. 5 is one embodiment of a fuzzy values probability graph for obstacle bearing of an Autonomous Collision Avoidance Navigation System.
Figure 6:
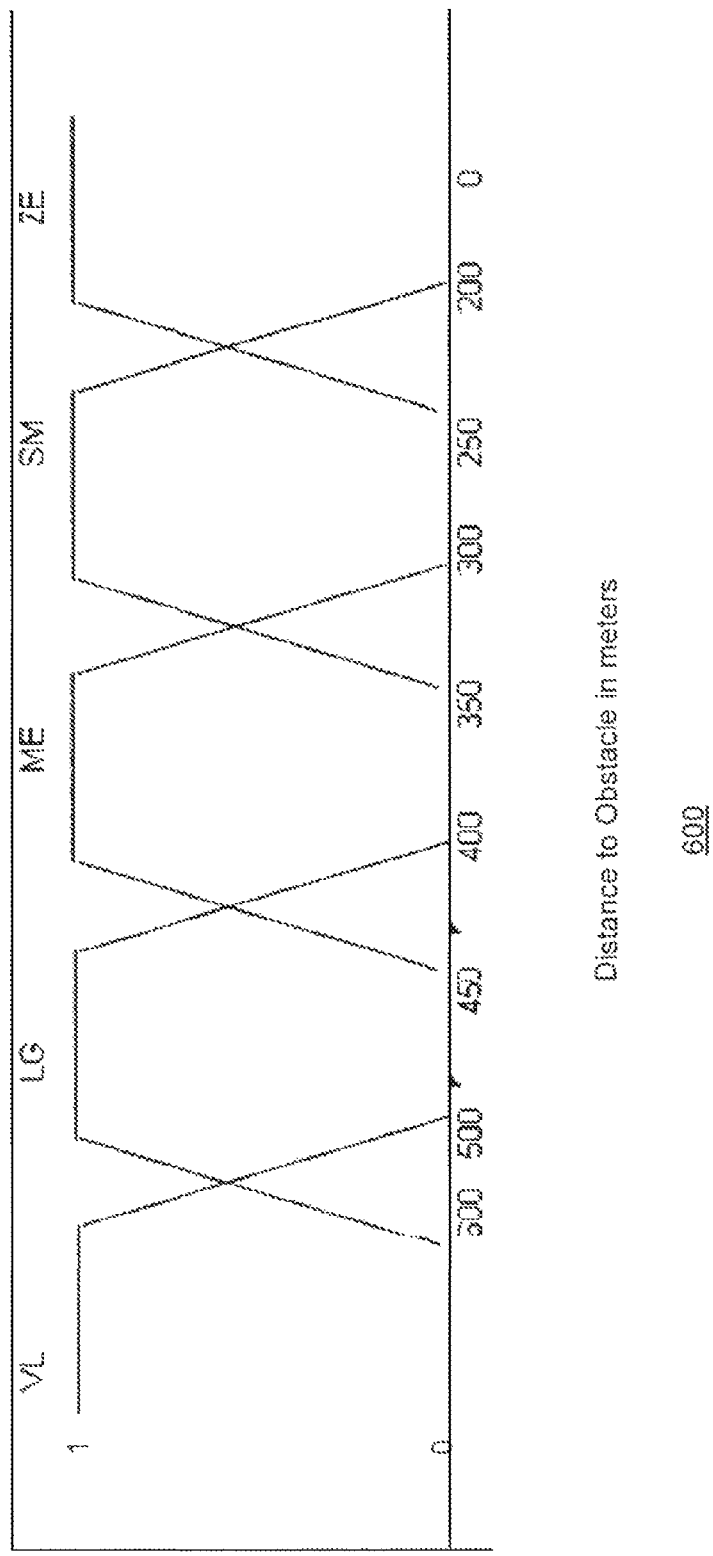
FIG. 6 is one embodiment of a fuzzy values probability graph for obstacle distance of an Autonomous Collision Avoidance Navigation System.

FIGS. 4-6 are example embodiments of a fuzzy rule set and fuzzy values probability graphs used by one embodiment of fuzzy MCAD controller 222. The fuzzy rule set and fuzzy values probability graphs provide ownship turning guidance based on an obstacle's bearing for distances less than or equal to a predetermined distance, which for purposes of illustration only is 600 meters. The fuzzy MCAD controller 222 (FIG. 2) provides guidance to slow ownship velocity when an obstacle is less than or equal to a predetermined distance. In one embodiment, fuzzy MCAD controller 222 provides guidance to slow own ship velocity to 50% of current velocity although other reductions or rules of operation for a given environment could also readily be incorporated for use by the system. As previously mentioned, all bearings remain relative to ownship heading of zero degrees.

FIG. 4 is one embodiment of a fuzzy rule set for system response chart for use by fuzzy MCAD controller 222. As shown in FIG. 4, one of six fuzzy output functions (i.e., NB, NM, NS, PB, PM, and PS) is determined by inputting a column value (i.e., STB1, PRT1, STB2, and STB3) and a row value (i.e., VL, LG, ME, SM, and ZE) in the lookup table (i.e., fuzzy rule set for system response chart). For example, when a column value of PRT1 and row value of ZE are input, a fuzzy output function of NB is determined because NB is the fuzzy output function associated with the intersection of column PRT1 and row ZE. Another method of expressing the fuzzy rule set of FIG. 4 is to state 20 separate rules corresponding to each of the 20 intersections of the fuzzy rule set of FIG. 4.

An exemplary set of such rules follows in Table 1 below.

TABLE 1

| Fuzzy Rule Set | | | |
| --- | --- | --- | --- |
| Rule Number | Column Value | Row Value | Output Function |
| 1 | STB1 | VL | PS |
| 2 | PRT1 | VL | NS |
| 3 | STB2 | VL | PS |
| 4 | STB3 | VL | PM |
| 5 | STB1 | LG | PS |
| 6 | PRT1 | LG | NM |
| 7 | STB2 | LG | PS |
| 8 | STB3 | LG | NM |

TABLE 1-continued

Fuzzy Rule Set

| Rule Number | Column Value | Row Value | Output Function |
|---|---|---|---|
| 9 | STB1 | ME | PS |
| 10 | PRT1 | ME | NM |
| 11 | STB2 | ME | PS |
| 12 | STB3 | ME | PM |
| 13 | STB1 | SM | PM |
| 14 | PRT1 | SM | NM |
| 15 | STB2 | SM | PS |
| 16 | STB3 | SM | PB |
| 17 | STB1 | ZE | PM |
| 18 | PRT1 | ZE | NB |
| 19 | STB2 | ZE | PM |
| 20 | STB3 | ZE | PB |

The six fuzzy output functions (i.e., NB, NM, NS, PB, PM, and PS) correspond to the amount of own ship rudder deflection. In one embodiment, NB equals −3; NM equals −2; NS equals −1; PB equals 3; PM equals 2; and PS equals 1, where these values are scaled to represent degrees of rudder deflection as a singleton or fuzzy value. In one embodiment, the singleton is calculated by use of the following equations:

$$\text{rudder deflection} = \text{scale}M[\text{index}] * \text{scaledValue} + \text{scale}B[\text{index}] \quad \text{Equation 1}$$

$$\text{scale}M[\text{index}] = (\text{trueEnd} - \text{trueBegin})/(\text{sourceEnd} - \text{sourceBegin}) \quad \text{Equation 2}$$

$$\text{scale}B[\text{index}] = \text{trueBegin} - \text{scale}M[\text{index}] * \text{sourceBegin} \quad \text{Equation 3}$$

The six fuzzy output functions map to an "index" identifier. The scaleM[0]=NB, scaleM[1]=NM, etc. The trueBegin and trueEnd values corresponsed to desired actual rudder deflections such as −20 to 20 degrees. The sourceBegin and sourceEnd correspond to −3 to 3.

FIG. 5 illustrates one embodiment of a fuzzy values probability graph for use by of fuzzy MCAD controller 222. As shown in FIG. 5, one or more of four fuzzy values (i.e., STB1, PRT1, STB2, and STB3) is determined by inputting a bearing to obstacle. For example, a bearing to obstacle of 20 degrees input determines a STB1 fuzzy value because STB1 has a 100% probability at 20 degrees input according to FIG. 5. From zero to approximately 40 degrees, STB1 fuzzy value has 100% probability. From approximately 40 degrees to approximately 70 degrees, STB1 and PRT1 fuzzy values have between zero and 100% probabilities. From approximately 70 degrees to approximately 170 degrees, PRT1 fuzzy value has a 100% probability. From approximately 170 degrees to approximately 190 degrees, STB2 and PRT1 fuzzy values have between zero and 100% probabilities. From approximately 190 degrees to approximately 280 degrees, STB2 fuzzy value has a 100% probability. From approximately 280 degrees to approximately 292 degrees, STB2 fuzzy value has between zero and 100% probabilities. From approximately 292 degrees to approximately 310 degrees, STB3 fuzzy value has between zero and 100% probabilities. From approximately 310 degrees to approximately 360 degrees, STB3 fuzzy value has a 100% probability.

FIG. 6 is one example of a fuzzy values probability graph for use by fuzzy MCAD controller 222 (FIG. 2). As shown in FIG. 6, one or more of five fuzzy values (i.e., VL, LG, ME, SM, and ZE) is determined by inputting a distance to obstacle. For example, a distance to obstacle of 100 meters input determines a ZE fuzzy value because ZE has a 100% probability at 100 meters input according to FIG. 6. From zero to approximately 200 meters, ZE fuzzy value has 100% probability. From approximately 200 meters to approximately 250 meters, ZE and SM fuzzy values have between zero and 100% probabilities. From approximately 250 meters to approximately 300 meters, SM fuzzy value has a 100% probability. From approximately 300 meters to approximately 350 meters, SM and ME fuzzy values have between zero and 100% probabilities. From approximately 350 meters to approximately 400 meters, ME fuzzy value has a 100% probability. From approximately 400 meters to approximately 450 meters, ME and LG fuzzy values have between zero and 100% probabilities. From approximately 450 meters to approximately 500 meters, LG fuzzy value has a 100% probability. From approximately 500 meters to approximately 550 meters, LG and VL fuzzy values have between zero and 100% probabilities. From approximately 550 meters to approximately 600 meters, VL fuzzy value has a 100% probability.

Figure 7:
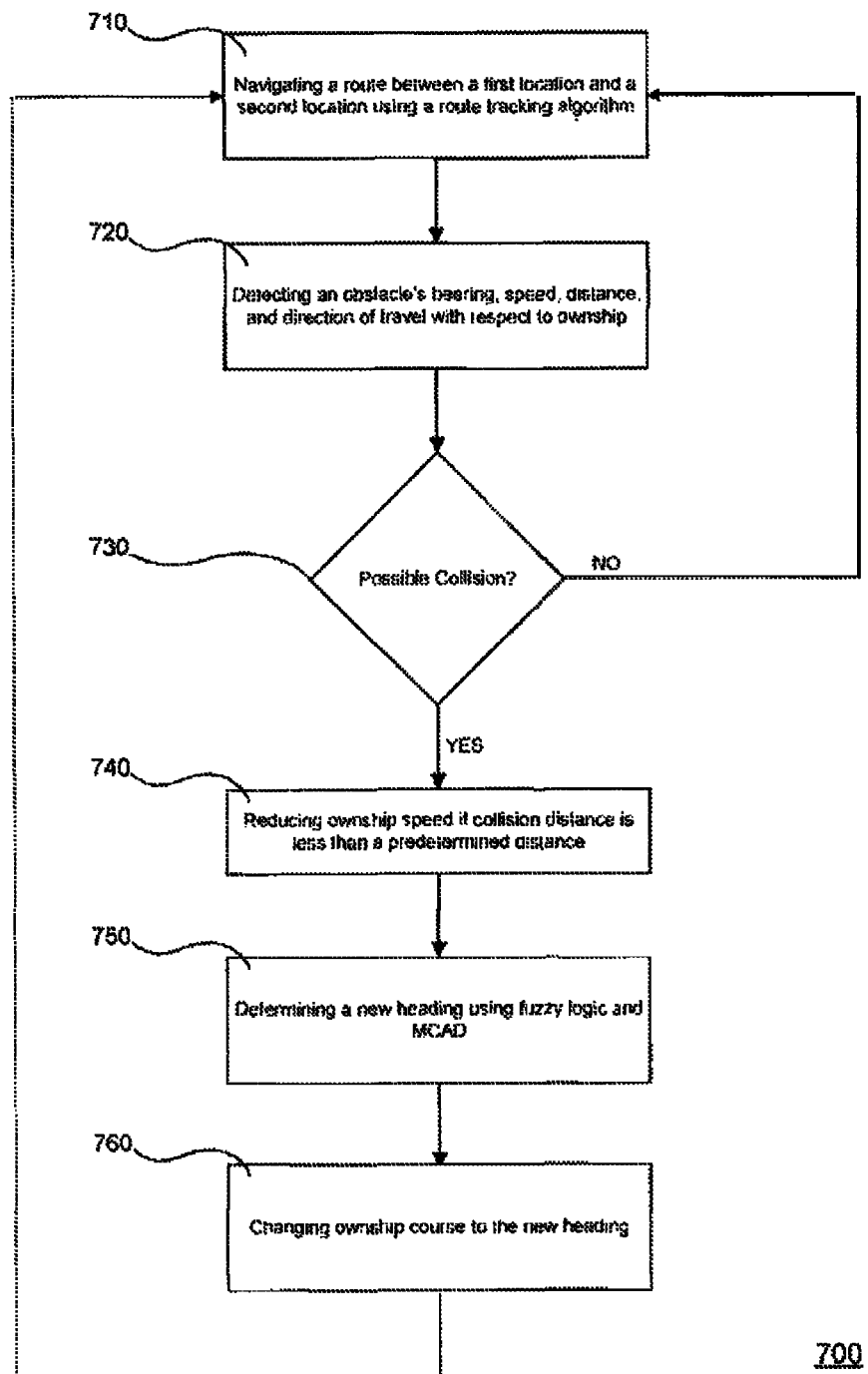
FIG. 7 is a flowchart of one embodiment of a method for an Autonomous Collision Avoidance Navigation System.

FIG. 7 illustrates an example of a flowchart of one embodiment of a method for an ACANS. While flowchart 700 describes one embodiment of an exemplary method for an ACANS, other embodiments may utilize procedures different from those shown in flowchart 700 without departing from the scope or spirit of the method. As shown in FIG. 7, the method begins at STEP 710 of flowchart 700 in which a route between a first location and a second location using a route tracking algorithm is determined. The navigation at STEP 710 may utilize uses an autopilot system to determine a route between a first location and a second location.

At STEP 720, an obstacle's bearing, speed, distance, and direction of travel with respect to ownship is detected. In one embodiment of STEP 720, the method uses obstacle detection device 150 of FIG. 1 to detect an obstacle's geographical location, speed and direction with respect to ownship. STEP 720 may utilize a RADAR, ARPA RADAR, LIDAR or SONAR system, or a combination thereof, to detect an obstacle's bearing, speed, distance, and direction of travel with respect to own ship.

At STEP 730, the method determines whether a collision is possible. If a collision is not possible, then the method returns to STEP 710 where the method begins again. If a collision is possible, then the method proceeds to STEP 740. At STEP 740 of flowchart 700, the method reduces own ship speed if an obstacle distance is less than a predetermined distance. In one embodiment of STEP 740 of flowchart 700, the method reduces own ship speed if an obstacle distance is less than 600 meters. The distance will vary according to the size and maneuverability of the craft. A large unmanned vehicle needs more distance to maneuver to avoid collision. This could be expressed in a table of recommended distances.]

Next at STEP 750, the method determines a new heading using fuzzy logic and MCAD rule set. In one embodiment of STEP 750, the MCAD rules of FIG. 3 are used by the fuzzy MCAD controller 222 of FIG. 2 to determine a new heading for ownship. In one embodiment of STEP 750, the method uses the following MCAD methodology to determine a new heading. For an obstacle between 331 and 30 degrees (inclusive), MCAD guidance is for own ship to turn right (i.e., starboard) 30 to 60 degrees. For an obstacle between 31 and 70 degrees (inclusive), MCAD guidance is for own ship to turn right until the obstacle is greater than 30 degrees to own ship port bow. For an obstacle between 71 and 150 degrees (inclusive), MCAD guidance is for own ship to turn left (i.e., portside) until the obstacle is astern. For an obstacle between 151 and 180 degrees (inclusive), MCAD guidance is for own ship to turn left approximately 30 degrees. For an obstacle between 181 and 292.5 degrees (inclusive), MCAD guidance is for own ship to turn right until the obstacle is astern. For an obstacle between 292.6 and 330 degrees (inclusive), MCAD guidance is for own ship to turn right until the obstacle is abeam to port.

In one embodiment of STEP 750, the method uses the fuzzy logic of FIGS. 4-6 to determine a new heading. In one embodiment of STEP 750, the method uses a fuzzy rule set for system response chart for use by fuzzy MCAD controller 222 of FIG. 2. In one embodiment of STEP 750, the method uses the lookup table of FIG. 4 to determine a new heading using one of six outputs. In one embodiment of STEP 750, the method uses the fuzzy rule set defined in Table 1 above (incorporated herein by reference).

In one embodiment of STEP 750, the method uses assigned values corresponding to the six possible outputs from the lookup table of FIG. 4. In one embodiment, NB equals –3; NM equals –2; NS equals –1; PB equals 3; PM equals 2; and PS equals 1, where these values are scaled to represent degrees of rudder deflection. In one embodiment, NB equals –3, which represents negative 21 degrees of rudder deflection; NM equals –2, which represents negative 14 degrees of rudder deflection; NS equals –1, which represents negative 7 degrees of rudder deflection; PB equals 3, which represents positive 21 degrees of rudder deflection; PM equals 2, which represents positive 14 degrees of rudder deflection; and NS equals 1, which represents positive 7 degrees of rudder deflection. In one embodiment, NB equals –3, which represents a rudder deflection selected from an angle between negative 20 and negative 30 degrees.

In one embodiment of STEP 750, the method uses a fuzzy values probability graph as shown in FIG. 5, to determine one or more of four fuzzy values (i.e., STB1, PRT1, STB2, and STB3) by inputting a bearing to obstacle. The method uses the fuzzy values in conjunction with the lookup table of FIG. 4 to determine a new heading. In one embodiment of STEP 750, the method uses the following rules to determine one or more of four fuzzy values. From zero to approximately 40 degrees, STB1 fuzzy value has 100% probability. From approximately 40 degrees to approximately 70 degrees, STB1 and PRT1 fuzzy values have between zero and 100% probabilities. From approximately 70 degrees to approximately 170 degrees, PRT1 fuzzy value has a 100% probability. From approximately 170 degrees to approximately 190 degrees, STB2 and PRT1 fuzzy values have between zero and 100% probabilities. From approximately 190 degrees to approximately 280 degrees, STB2 fuzzy value has a 100% probability. From approximately 280 degrees to approximately 292 degrees, STB2 fuzzy value has between zero and 100% probabilities. From approximately 280 degrees to approximately 310 degrees, STB3 fuzzy value has between zero and 100% probabilities. From approximately 310 degrees to approximately 360 degrees, STB3 fuzzy value has a 100% probability.

In an alternate embodiment of STEP 750, the method uses a fuzzy values probability graph as shown in FIG. 6, to determine one or more of five fuzzy values (i.e., VL, LG, ME, SM, and ZE) by inputting a distance to obstacle. The method uses the fuzzy values in conjunction with the lookup table of FIG. 4 to determine a new heading. In one embodiment of STEP 750, the method uses the following rules to determine one or more of five fuzzy values. From zero to approximately 200 meters, ZE fuzzy value has 100% probability. From approximately 200 meters to approximately 250 meters, ZE and SM fuzzy values have between zero and 100% probabilities. From approximately 250 meters to approximately 300 meters, SM fuzzy value has a 100% probability. From approximately 300 meters to approximately 350 meters, SM and ME fuzzy values have between zero and 100% probabilities. From approximately 350 meters to approximately 400 meters, ME fuzzy value has a 100% probability. From approximately 400 meters to approximately 450 meters, ME and LG fuzzy values have between zero and 100% probabilities. From approximately 450 meters to approximately 500 meters, LG fuzzy value has a 100% probability. From approximately 500 meters to approximately 550 meters, LG and VL fuzzy values have between zero and 100% probabilities. From approximately 550 meters to approximately 600 meters, VL fuzzy value has a 100% probability.

At STEP 760, the method changes ownship course to the new heading. In one embodiment of STEP 760, the method uses rudder actuator 140 of FIGS. 1-2 to change ownship course to the new heading. After STEP 760, the method then returns to STEP 710 where the method begins again.

In view of the above, it will be understood that many additional changes in the details, materials, steps and arrangement of parts, which have been herein described and illustrated to explain the nature of the disclosure, may be made by those skilled in the art within the principal and scope of the disclosure as expressed in the appended claims.

What is claimed is:

1. A method comprising:
autonomous manipulation of a marine vessel having throttle and rudder controls, along with obstacle detection devices coupled to a computer, wherein the computer performs the following steps:
a) determines a desired route of travel for the marine vessel using route planning software and storing the route on the computer;
b) navigates the vessel between a first location and a second location along the determined route using a route tracking algorithm;
c) detects an obstacle and said obstacle's bearing, distance, and movement, if any, with respect to the vessel;
d) determines whether current marine vessel movement is likely to result in a collision between said marine vessel and said obstacle;
e) proceeds to step (f) if the collision is likely or return to step (b) if not;
f) reduces marine vessel speed in a predetermined manner with respect to distance or time to obstacle;
g) determines a new heading for the marine vessel using fuzzy logic and Modified Course Alteration Diagram information after passage of a predetermined time from initial obstacle detection and continuous threat of possible collision with said obstacle;
h) changes marine vessel course to the new heading determined in step (g);
i) returns to step (b).

2. The method of claim 1, wherein steps (a and b) use an autopilot system.

3. The method of claim 2, wherein the step of detecting the obstacle and the obstacle's bearing, speed, distance, and movement is accomplished by using a RADAR system.

4. The method of claim 2, wherein the obstacle and the obstacle's bearing, speed, distance, and movement is accomplished by using an ARPA RADAR system.

5. The method of claim 2, wherein the obstacle and the obstacle's bearing, speed, distance, and movement is accomplished by using a LIDAR system.

6. The method of claim 2, wherein the obstacle and the obstacle's bearing, speed, distance, and movement is accomplished by using a SONAR system.

7. The method of claim 2, wherein step (f) comprises reducing marine vehicle speed when collision distance to said obstacle is less than 600 meters.

8. The method of claim 1, wherein step (g) comprises:
   i) determining fuzzy logic values based on a combination of magnetic bearing and distance to detected obstacle; and
   ii) determining appropriate throttle and rudder controls based on the determined fuzzy logic values.

9. The method of claim 8, wherein step (i) comprises determining fuzzy logic values based on fuzzy values probability determinations for bearing to said obstacle and distance to said obstacle.

10. The method of claim 9, wherein step (i) comprises determining fuzzy logic values, in a system having a first set of four fuzzy values, based on fuzzy values probabilities for bearing to said obstacle from current course heading of the marine vessel by dividing the three hundred and sixty degree compass heading into eight distinct regions using the following rules:
   a) a first region in which a first fuzzy value equates to 100% probability;
   b) a second region in which the first fuzzy value and a second fuzzy value each have between zero and 100% probabilities;
   c) a third region in which the second fuzzy value has 100% probability;
   d) a fourth region in which a third fuzzy value and the second fuzzy value have between zero and 100% probabilities;
   e) a fifth region in which the third fuzzy value has 100% probability;
   f) a sixth region in which the third fuzzy value has between zero and 100% probabilities;
   g) a seventh region in which a fourth fuzzy value has between zero and 100% probabilities;
   h) an eighth region fourth fuzzy value has 100% probability.

11. The method of claim 10, wherein the eight distinct regions are defined using the following rules:
   a) the first region is from zero to 40 degrees;
   b) the second region is from 41 to 70 degrees;
   c) the third region is from 71 to 170 degrees;
   d) the fourth region is from 171 to 190 degrees;
   e) the fifth region is from 191 to 280 degrees;
   f) the sixth region is from 281 to 292 degrees;
   g) the seventh region is from 293 to 310 degrees; and,
   h) the eighth region is from 311 to 360 degrees.

12. The method of claim 9, wherein step (i) comprises determining a second set of five fuzzy logic values based on fuzzy values probability graphs for distance to said obstacle from the marine vessel in which nine unique range to obstacle distances are defined using the following rules:
   a) a first range in which a fifth fuzzy value has 100% probability;
   b) a second range in which the fifth and a sixth fuzzy values have between zero and 100% probabilities;
   c) a third range in which the sixth fuzzy value has 100% probability;
   d) a fourth range in which the sixth and a seventh fuzzy values have between zero and 100% probabilities;
   e) a fifth range in which the seventh fuzzy value has 100% probability;
   f) a sixth range in which the seventh and an eighth fuzzy values have between zero and 100% probabilities;
   g) a seventh range in which the eighth fuzzy value has 100% probability;
   h) an eighth range in which the eighth and a ninth fuzzy values have between zero and 100% probabilities;
   i) a ninth range in which the ninth fuzzy value has 100% probability.

13. The method of claim 12, wherein the nine unique ranges are defined as follows:
   a) the first range is from zero to 200 meters;
   b) the second range is from 201 to 250 meters;
   c) the third range is from 251 to 300 meters;
   d) the fourth range is from 301 to 350 meters;
   e) the fifth range is from 351 to 400 meters;
   f) the sixth range is from 401 to 450 meters;
   g) the seventh range is from 451 to 500 meters;
   h) the eight range is from 501 to 550 meters; and,
   i) the ninth range is from 551 to 600 meters.

* * * * *